Aug. 27, 1957     O. SEIFFERLE     2,804,089
ADJUSTABLE PRESSURE REGULATING VALVE
Filed March 24, 1955     2 Sheets-Sheet 2
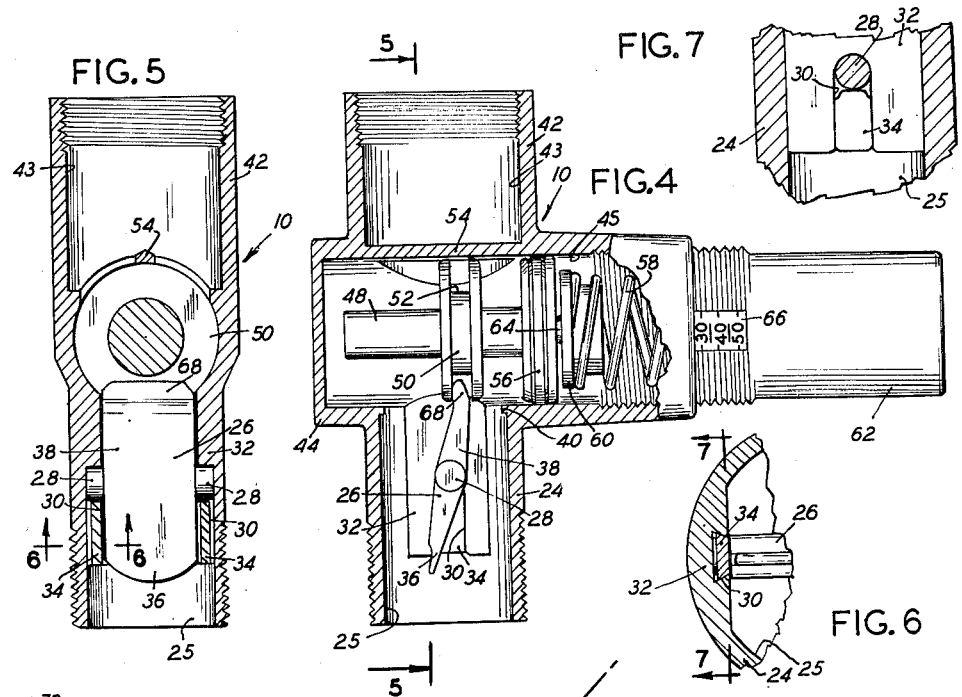
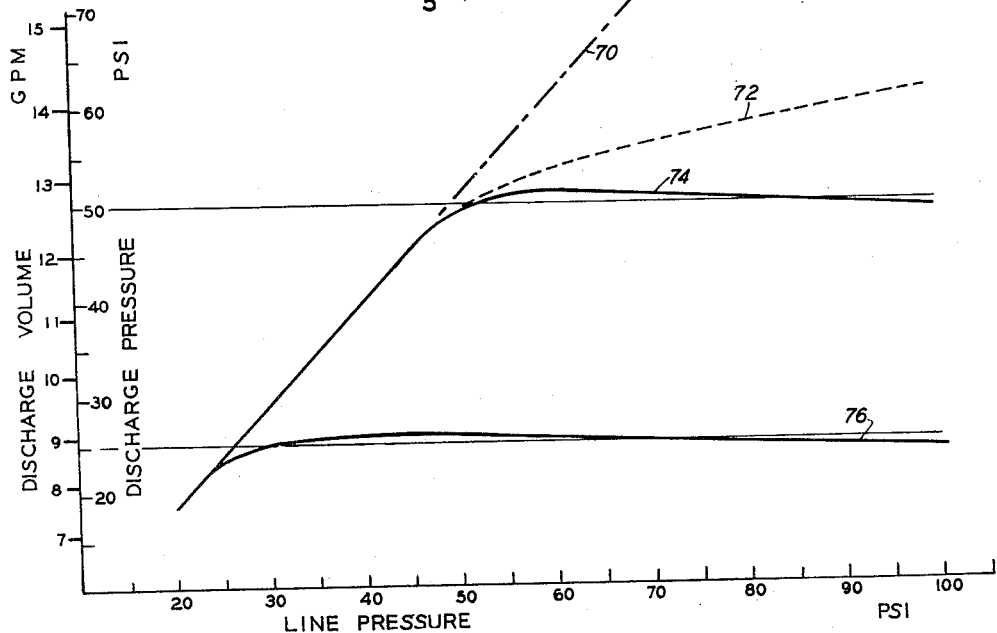
FIG. 8
INVENTOR.
OLIVER SEIFFERLE
BY
Buckhorn and Cheatham
ATTORNEYS

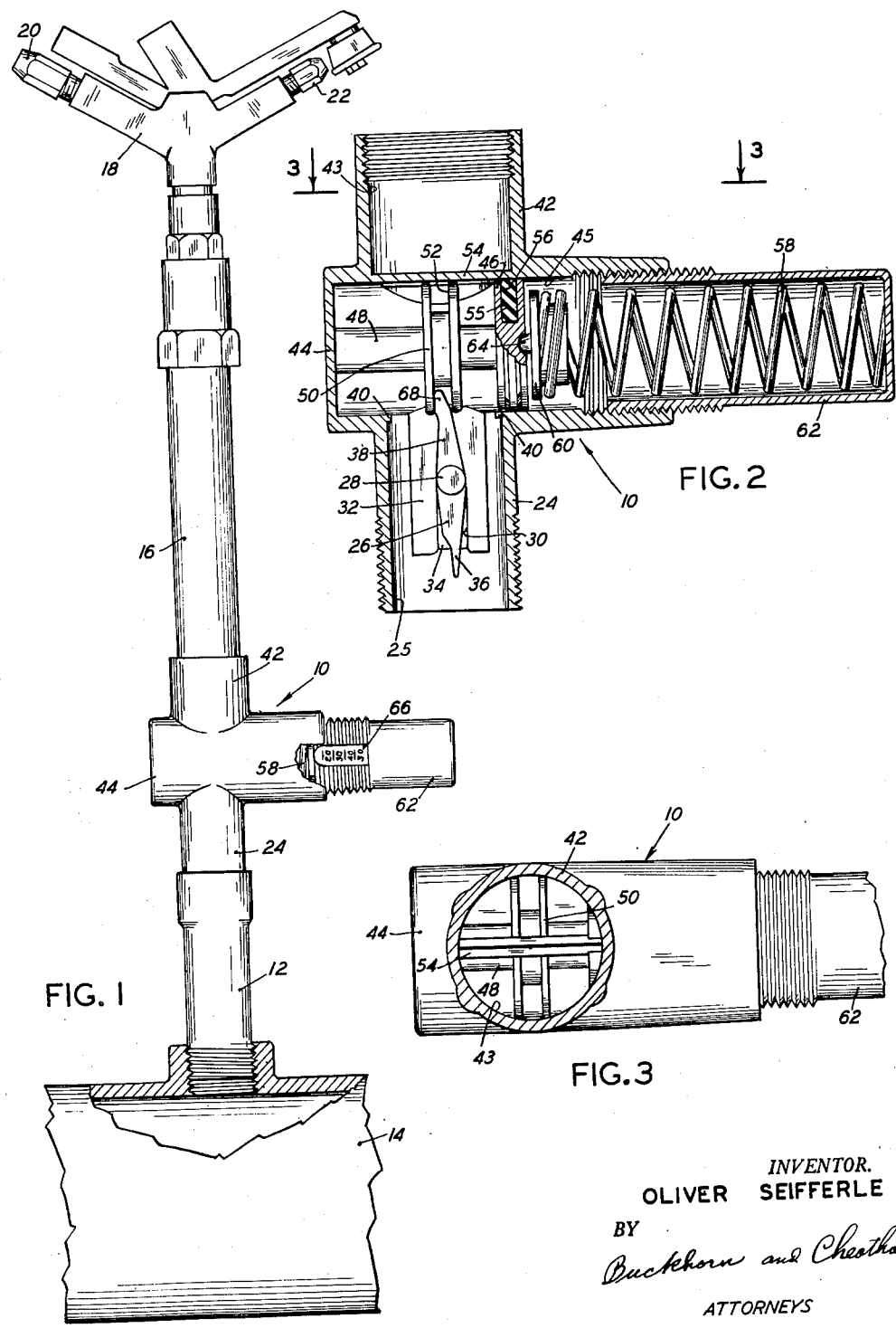

United States Patent Office 2,804,089
Patented Aug. 27, 1957

2,804,089

ADJUSTABLE PRESSURE REGULATING VALVE

Oliver Seifferle, Baker, Oreg.

Application March 24, 1955, Serial No. 496,458

4 Claims. (Cl. 137—505.14)

This invention relates to an adjustable pressure regulating valve, and more particularly to a regulating valve adapted to be positioned in a conduit delivering fluid from a source of fluid pressure to a discharge orifice, which device can be set for a desired discharge pressure and which will maintain such desired pressure in the conduit between the regulating valve and the discharge orifice substantially constant even though the size of the orifice is varied within wide limits and the pressure of the source also varies within wide limits.

The regulating valve of the present invention is particularly adapted for employment with sprinkler heads in field irrigation sprinkler systems. Modern field irrigation systems include large main conduits which may be permanently placed, but which are usually composed of sections of pipe coupled together by separable couplings to enable the conduit to be rapidly moved from place to place about a large field to be irrigated. Such pipes are provided with a plurality of risers, the top of each being provided with a sprinkler head. The sprinkler heads for a given installation usually have discharge orifices or nozzles of fixed size and, in general, it is desirable that all of the sprinkler heads discharge the same amount of water. Since a large number of risers and sprinkler heads are connected to the same main conduit and distributed therealong, it is apparent that the pressure of the water supplied to the sprinkler heads more remote from the pump or other water supply is less than that supplied to the sprinkler heads nearer the supply. That is to say, the water pressure will progressively decrease along the main conduit even if the field being watered is completely level. Furthermore, the difference in static head at spaced points along the main conduit may be very substantial on fields that are not level so that the pressure at the sprinkler heads varies widely at different locations along the main. It becomes extremely difficult, if not impossible, to secure an even distribution of irrigation water over the field.

In accordance with the present invention, a simple and relatively inexpensive adjustable pressure regulating valve has been developed which can be incorporated in the riser leading to each sprinkler head. The regulating valve includes a movable member having an effective piston area exposed to the discharge pressure in a pressure regulator chamber positioned between the regulating valve and the discharge orifice. The movement of such member by the discharge pressure is resisted by a spring, the spring force of which can be adjusted. The movement of the movable member against the spring pressure is employed to move a valve member in a direction restricting the inlet passage leading to the regulator chamber. The arrangement thus far discussed is that of a conventional pressure regulator and tends to reduce the variation in the amount of water delivered through a given size nozzle orifice as the pressure in the main varies, but the amount of water discharged through the orifice will still vary to a substantial degree with variation of the water pressure in the main. The present device, however, provides a structure in which fluid forces acting directly upon the valve member itself when the valve member is in partly closed position also tend to close the valve. These forces assist the force due to pressure in the regulator chamber acting upon the movable member, and the result is a pressure regulating valve which maintains the discharge pressure, i. e., the pressure of the water supplied to the discharge orifice, substantially constant even though the pressure of the source varies widely. For a discharge orifice of given size, this means that the discharged volume is maintained substantially constant. Also, the structure is such that the discharge pressure remains substantially the same even though nozzles having orifices of different sizes are substituted for each other. Furthermore, the regulator is adjustable so that the discharged volume may be maintained constant at selected values throughout a wide range.

It is therefore an object of the present invention to provide an improved adjustable pressure regulating valve.

Another object of the invention is to provide a pressure regulating valve of simple structure which will maintain the discharge pressure in a conduit between the valve and a discharge orifice substantially constant when the pressure on the fluid supplied to the valve varies within wide limits.

Another object of the invention is to provide a pressure regulating valve which will maintain the fluid pressure supplied to a discharge orifice substantially constant even though the size of the discharge orifice is varied within wide limits.

Another object of the invention is to provide an improved adjustable pressure regulating valve which may proved adjusted to provide a desired fluid pressure between the valve and a discharge orifice and which will maintain the adjusted pressure substantially constant when the fluid pressure supplied from the source varies or the size of the discharge orifice is varied.

A further object of the invention is to provide an adjustable pressure regulating valve particularly adapted for employment in the risers in field irrigation systems having a plurality of sprinkling heads supplied from a main conduit.

A still further object of the invention is to provide a pressure regulating valve in which fluid forces acting directly upon a valve member tend to move said valve member toward a closed position and are employed, in conjunction with forces due to fluid pressure acting on a member positioned on the discharge side of said valve member, to move the valve member toward a closed position, the conjoint forces being balanced against an adjustable spring force to maintain a substantially constant discharge pressure for a given adjustment of said spring force.

Other objects and advantages of the invention will appear in the following description of a preferred embodiment thereof given in connection with the attached drawings of which:

Fig. 1 is a side elevation of a riser carrying a sprinkler head and connected to a main conduit with the pressure regulating valve of the present invention in said riser;

Fig. 2 is a vertical section, on an enlarged scale, taken through the regulating valve structure only;

Fig. 3 is a partial horizontal section taken on the line 3—3 of Fig. 2;

Fig. 4 is a view of the valve structure, partly in elevation and partly in vertical section, showing the parts in a different position from that shown in Fig. 2;

Fig. 5 is a vertical section taken on the line 5—5 of Fig. 4;

Fig. 6 is a fragmentary horizontal section, on an enlarged scale, taken on the line 6—6 of Fig. 5;

Fig. 7 is a fragmentary vertical section taken on the line 7—7 of Fig. 6; and

Fig. 8 is a graph illustrating the performance of the regulating valve of the present invention as compared to other types of regulating valves.

Referring more particularly to the drawings, the adjustable pressure regulating valve of the present invention is indicated generally at 10 and may be positioned intermediate the length of a raiser having a lower portion 12 connected to the main conduit 14 and an upper portion 16 connected to and supporting a sprinkler head 18 of any desired type, for example, one having a pair of fixed orifice or nozzle members 20 and 22. The sprinkler head 18 may be rotatable upon the upper portion 16 of the riser, as is well known in the art. The details of the sprinkler head form no part of the present invention and will not be further described.

The pressure regulating valve includes an inlet portion 24 connected to the lower portion 12 of the riser and providing an inlet passage 25 in which is positioned a valve member 26 of the butterfly type. The valve member 26 has integral trunnions 28 extending laterally therefrom and positioned in grooves 30 which extend in a direction parallel to the axis of the inlet portion 24 and are formed in thickened portions 32 of the walls of such inlet portion. The grooves 30 open toward the opening into the inlet passage 25 and terminate at a point intermediate the length of such inlet passage. The grooves are of undercut or dovetail form and, as shown most clearly in Fig. 6, wedge members 34 of dovetail form may be driven into the grooves 30 to retain the trunnions 28 in position between the wedge members and the ends of the grooves 30 so that the valve member 26 is held in position in the inlet passage 25 of the valve member for pivotal movement about the trunnions 28.

The valve member 26 fills the space between the wall portions 32 and has an arm 36 extending toward the entrance into the inlet passage 25 which is tapered to an end edge fitting the contour of the interior of said passage when the valve is in closed position. The valve member also has a tapered arm 38 extending in the opposite direction, the surface of which engages an inwardly extending rib 40 in the interior of the inlet portion 24 when the valve member 26 is in closed position. The valve member 26 may occupy any position between that shown in Fig. 2, in which the valve member is in its open position centrally of and extending longitudinally of the inlet passage, and a position in which the valve member extends across the inlet passage at an angle to the axis thereof so as to substantially close such inlet passage.

The regulator valve also includes a discharge portion 42 having a discharge passage 43 for connection to the upper portion 16 of the riser and a laterally extending, cylindrical, pressure regulator chamber portion 44 providing a cylinder 45 in which is positioned a piston 46. The piston is provided with an axially extending stem 48 engaging the top of the chamber portion 44 to limit movement of the piston 46 inwardly of the chamber portion, the stem having an intermediate guide portion 50 containing an annular groove 52 in its periphery. The guide portion 50 fits the cylindrical interior of the chamber portion 44. The discharge passage 43 is of large diameter and a guide rib 54 extends thereacross longitudinally of the chamber portion 44 in guiding engagement with the edge of the guide portion 50.

The piston 46 is provided with an annular groove 55 for receiving a packing member 56 of any suitable material such as a rubberous material which prevents leakage of water past the piston. It will be apparent that the piston has an effective piston area exposed to the water pressure in the chamber portion 44 and that such pressure tends to move the piston to the right in Fig. 2. Such motion is resisted by a compression spring 58 extending between a spring retainer 60 and the bottom of a cup member 62 screw-threaded into the open end of the chamber portion 44, the retainer 60 having a central projection 64 engaging in a centrally positioned recess in the piston 46 so as to transmit the resisting force of the spring to the piston centrally of the latter. The cup member 62 may be turned relative to the remainder of the valve structure to adjust the spring force exerted on the piston and is provided with a slot 66 extending longitudinally of the cup portion through the threads thereon. The slot provides for access of the atmosphere to the cup member 62 so that the side of the piston 46 against which the spring force is exerted is also exposed to atmospheric pressure. The slot 66 may have its bottom surface provided with graduations in pounds per square inch gauge pressure, the position of the graduations relative to the edge of the opening into which the cup member is threaded being an indication of the discharge pressure for which the regulator valve is set.

The valve member 26 has an extending portion 68 on its arm 38 which is positioned in the annular groove 52 of the guide portion 50 so that motion of the guide portion and piston 46 to the right in Fig. 2 tends to close the valve, i. e., tends to restrict the inlet passage 25. This reduces the pressure in the regulator chamber portion 44 and in the discharge passage 43 leading to the sprinkler head 18. Depending upon the spring force, which force can be adjusted by rotating the cup member 62, the piston 46 and valve member 26 assume a position where the forces on the piston 46 and on the valve member 26 are balanced by the spring force from the spring 58. With the structure of the present regulating valve, it has been found that the pressure in the regulator chamber portion 44, and therefore in the discharge passage 43, for a given adjustment of the cup member 62 remains substantially constant even when the pressure of the water supplied to the regulating valve through the inlet passage 25 varies widely and even when nozzle members having different size discharge orifices are substituted for the nozzle members 20 and 22.

The results obtained by a specific example of a regulator valve are illustrated by the curves of Fig. 8. The curve 70 shows the volume of water in gallons per minute discharged through a nozzle having a quarter-inch orifice therein for various line pressures if there were no pressure regulating valve between the line and the orifice. The horizontal scale represents line pressure in pounds per square inch gauge, and the vertical scale represents discharged volume in gallons per minute and also discharge pressure in pounds per square inch gauge. For the curve 70, the discharge pressure, i. e., the pressure drop across the discharge orifice, is, of course, the same as the line pressure. The discharged volume, however, increases at a rate somewhat greater than the increase in line pressure as shown by the fact that the scale for discharged volume is nonuniform. If pressure regulators of conventional types are employed, i. e., a pressure regulator in which the discharge pressure acting on a piston area only is balanced against spring pressure, for example, in a regulator having a gate valve connected to the piston, a curve of which the curve 72 is typical is obtained. That is to say, the discharge pressure continues to increase as line pressure increases. This follows from the fact that it takes increased pressure on the piston to further move the piston in a valve-closing direction against the spring as the line pressure increases. The volume of water discharged still varies with the line pressure, although the variation is not as great as when no regulating valve of any kind is employed.

The curve 74 is an actual curve obtained with the pressure regulating valve of the present invention when the valve was set for fifty pounds per square inch discharge pressure. The inlet passage 25 of the valve employed had a one-inch internal diameter, and a nozzle having a discharge orifice one-quarter inch in diameter was connected to the discharge passage 43. The line pressure was varied between twenty and one hundred pounds per square inch gauge. Since the valve was set to operate at fifty pounds per square inch, it did not come into operation until the line pressure approached fifty pounds per square inch. For line pressures increasing above that value, the volume of water discharged and the discharge pressure remained substantially constant and, in fact, decreased slightly. The curve 76 is another curve actually obtained when the valve of the present invention was set for a line pressure of twenty-five pounds per square inch. Within the range of approximately twenty-five pounds to a hundred pounds per square inch line pressure, the amount of water discharged and the discharge pressure remained substantially constant. Curves substantially identical with the curves 74 and 76 were obtained when the diameter of the discharge orifice was decreased to three-sixteenths of an inch so far as discharge pressure was concerned, although the amount of water discharged for a given discharge pressure was cut nearly in half. That is to say, the discharge pressure scale remained substantially the same and the only significant difference in the curves was that the discharged volume scale was changed. For example, the volume of water discharged when the valve was set for fifty pounds per square inch discharge pressure was approximately 7.4 gallons per minute for a three-sixteenths-inch orifice instead of approximately 12.7 gallons per minute for the one-quarter-inch orifice, and when the valve was set for a discharge pressure of twenty-five pounds per square inch the amount of water discharged was approximately 5 gallons per minute for a three-sixteenths-inch orifice instead of approximately 8.8 gallons per minute. Similar curves are obtained for intermediate settings of the spring force by the cup member 62 and with other orifices, the particular device illustrated being designed for discharge pressures ranging between approximately twenty and fifty pounds per square inch.

The results just discussed can only be explained on the basis that there are valve-closing forces acting on the valve member 26 adding to the force due to pressure on the piston 46 when the valve 26 is in partly closed position. The valve member 26 is unbalanced so far as the position of its pivotal axis is concerned. That is to say, the arm 36 of the valve member is somewhat greater in effective length and has somewhat greater effective area than the arm 38. If the fluid pressure forces due to the line pressure in the inlet portion of the valve and also those due to the discharge pressure in the chamber portion 44 were uniformly distributed over the cross section of the inlet passage, there would be a resulting force acting in valve-closing direction on the valve member when it is in closed or partly closed position. In the structure shown, the arm 36 has about one-tenth more effective area than the arm 38 so that, considering only the pressures just assumed, a resulting force tending to move the valve toward and hold it in closed position would be expected.

It appears that there are also forces caused by a reduction in fluid pressure due to Venturi action adjacent the ends of the arms 36 and 38 which tend to close the valve when the valve is in a partly closed position. In such position of the valve the inlet conduit is constricted on opposite sides of the valve member adjacent the ends of such arms, which means that the fluid velocity is greatest through such constricted portions and the fluid pressure lowest. On the left of the valve member 26 in Fig. 4, the fluid pressure should progressively increase from the end of the valve member nearest the inlet of the passage 25 to the end of the valve member nearest the chamber portion 44 and, conversely, on the right of the valve member the pressure should progressively decrease from the end of the valve member nearest the inlet of the passage 25 to the end of the valve member nearest the chamber portion 44. A force couple should thus be exerted on the valve member which increases as fluid flow increases and as the valve member approaches a closed position. This force couple would add to the force exerted by discharge fluid pressure on the piston 46 in a direction tending to close the valve. All of the forces acting on the valve member and the piston are balanced against the force of the spring 58, the spring force also increasing as the spring is compressed by movement of the piston 46 in the valve-closing direction. Since the spring force increases as the valve is moved toward closed position and the discharge pressure acting on the piston remains substantially constant when the line pressure increases, it is clear that there are fluid forces acting on the valve member which increase as the valve moves toward closed position, otherwise the curves 74 and 76 would have the form of the curve 72. These fluid forces acting on the valve member are very nearly equal to the increase in spring force as the spring is compressed by a valve-closing movement of the piston and are opposite in direction so as to compensate for such increase in spring force.

It is difficult to separate the effects of the two types of fluid forces acting directly upon the valve member but it is believed that the forces due to flow of fluid past the valve member are the major forces when the valve member is in partly closed position. Such forces should increase as the valve member moves toward closed position but should rapidly drop to zero as the valve member reaches closed position. It is also believed that the resulting fluid forces due to the unbalanced position of the pivotal axis of the valve member increase as the valve member approaches the closed position and reach a maximum when the valve member reaches closed position. In any event, fluid forces acting directly on the valve member are present and account for the operation of the present device. By employing a valve of the type in which fluid acting directly on a valve member tends to close the valve with a force which increases with movement of the valve toward closed position in combination with the force of the discharge pressure upon a piston area, the sum of these forces may be balanced by a spring to maintain a discharge pressure very nearly constant with widely varying line pressure and with discharge orifices of various sizes. While the device described above was developed for use in field irrigation systems, it is apparent that it is adapted for use in any type of system in which fluid is delivered from a variable pressure source to a discharge orifice and it is desired to maintain the pressure of the fluid supplied to such orifice substantially constant.

I claim as my invention:

1. A regulator for maintaining substantially constant the pressure of a fluid delivered to an orifice from a variable pressure source which comprises a body member providing a pressure regulating chamber having an inlet passage for connection to said source and an outlet passage for connection to said orifice, a butterfly valve member positioned in said inlet passage and pivoted intermediate its length about an axis extending transversely of said inlet passage, said valve member having an open position and being elongated axially of said inlet passage when in said open position and having an end extending into said chamber, said valve member substantially closing said passage when turned about its axis through an angle substantially less than a right angle from its open position, a movable member having an effective piston area exposed to the pressure in said chamber and movable by said pressure substantially tangential to the direction of movement of said end of said valve member, said movable member having a stem extending into said chamber at a position spaced from said end of said valve member in a direction toward said outlet passage, said stem having an enlarged guide portion engaging the walls of said chamber and connected to said end of said valve member so that movement of said movable member by the pressure in said chamber tends to close said valve, and resilient means resisting movement of said valve and movable member toward valve-closing position.

2. A regulator for maintaining substantially constant the pressure of a fluid delivered to an orifice from a variable pressure source which comprises a body member providing a pressure regulating chamber having an inlet passage for connection to said source and an outlet passage for connection to said orifice, a butterfly valve member positioned in said inlet passage and having laterally extending trunnions intermediate its length, the walls of said inlet passage having bearing portions receiving said trunnions for pivoting said valve member about an axis extending transversely of said inlet passage, said valve member having an open position and being elongated axially of said inlet passage when in said open position and substantially closing said passage when turned about its axis an angle substantially less than a right angle from its open position, said valve member having an end extending into said chamber, a movable member having an effective piston area exposed to the pressure in said chamber, said member being movable along a line substantially tangential to the movement of said end of said valve member and having a stem extending into said chamber at a position spaced from said end of said valve member in a direction toward said outlet passage, said stem having an enlarged guide portion engaging the walls of said chamber and connected to said end of said valve member so that movement of said movable member by the pressure in said chamber tends to move said valve to closed position, said valve member having its portion which extends from said trunnions away from said chamber of greater area than its portion which extends toward said chamber from said trunnions so that a pressure differential across said valve in a direction toward said chamber tends to move said valve toward closed position and adjustable spring means resiliently resisting movement of said valve toward said closed position.

3. A regulator for maintaining substantially constant the pressure of water delivered to a nozzle from a variable pressure source which comprises a body member providing a pressure regulating chamber having an inlet passage for connection to said source and an outlet passage for connection to said orifice, a butterfly valve member positioned in said inlet passage and pivoted intermediate its length about an axis extending transversely of said inlet passage, said valve member having an open position and being elongated axially of said inlet passage when in said open position and substantially closing said passage when turned about said axis through an angle substantially less than a right angle from its open position, said valve having an end extending into said chamber, a piston exposed to the pressure in said chamber, said piston being positioned in a cylinder extending laterally of said inlet passage and being movable along a line substantially tangential to the path of movement of said end of said valve member, said chamber being a continuation of said cylinder, said piston member having a stem extending into said chamber and having an enlarged guide portion engaging the walls of said chamber, said guide portion having a groove in its periphery, said end of said valve member extending into said groove so that movement of said piston by the pressure in said chamber tends to close said valve, and an adjustable compression spring resisting movement of said piston by said pressure.

4. A pressure regulator comprising a regulator body providing a pressure regulating chamber having an inlet passage and an outlet passage, a butterfly valve positioned in said inlet passage and having an open position, said valve being elongated in a direction axially of said inlet passage when in said open position and having laterally extending trunnions intermediate its length, the side walls of said inlet passage having dovetail grooves extending longitudinally of said inlet passage for receiving said trunnions, said grooves having open ends directed toward the entrance to said inlet passage and terminating at a point spaced from said chamber, dovetail wedge members frictionally engaged in the open ends of said grooves to retain said trunnions in position, said valve having an end extending into said chamber and having its portion extending toward said chamber from said trunnions of lesser area than the area of its portion extending from said trunnions away from said chamber so that a pressure differential across said valve in a direction toward said chamber tends to close said valve, a cylinder extending laterally of said inlet passage from said chamber, a piston in said cylinder providing an effective piston area subject to the fluid pressure in said chamber, spring means resiliently resisting movement of said piston by the pressure in said chamber, said piston having a stem extending into said chamber and having an enlarged guide portion engaging the walls of said chamber and also being connected to the end of said valve projecting into said chamber so that movement of said piston in response to pressure in said chamber tends to close said valve.

References Cited in the file of this patent

UNITED STATES PATENTS

| | | |
|---|---|---|
| 1,685,205 | Stein | Sept. 25, 1928 |
| 2,200,010 | Orem | May 7, 1940 |
| 2,669,071 | St. Clair | Feb. 16, 1954 |

FOREIGN PATENTS

| | | |
|---|---|---|
| 59,987 | Switzerland | of 1912 |
| 855,536 | Germany | of 1949 |